United States Patent
Schütz et al.

(10) Patent No.: US 12,159,184 B2
(45) Date of Patent: Dec. 3, 2024

(54) CODE READING APPARATUS

(71) Applicant: SICK AG, Waldkirch (DE)

(72) Inventors: Frank Schütz, Rheinhausen (DE); Andreas Jäckle, Freiburg (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/217,895

(22) Filed: Jul. 3, 2023

(65) Prior Publication Data

US 2024/0013015 A1   Jan. 11, 2024

(30) Foreign Application Priority Data

Jul. 5, 2022 (DE) .......................... 102022116676.7

(51) Int. Cl.
  *G06K 7/10* (2006.01)
  *G06K 7/14* (2006.01)

(52) U.S. Cl.
  CPC ....... *G06K 7/10564* (2013.01); *G06K 7/1413* (2013.01)

(58) Field of Classification Search
  CPC .................................................. G06K 7/10564
  USPC ..................................................... 235/462.06
  See application file for complete search history.

(56) References Cited

U.S. PATENT DOCUMENTS

| | | |
|---|---|---|
| 5,373,148 A | 12/1994 | Dvorkis et al. |
| 5,561,284 A | 10/1996 | Kiyonaga |
| 5,600,120 A | 2/1997 | Peng |
| 5,663,550 A | 9/1997 | Peng |

(Continued)

FOREIGN PATENT DOCUMENTS

| | | |
|---|---|---|
| DE | 4213340 A1 | 11/1992 |
| DE | 102009048445 A1 | 4/2011 |
| DE | 202012012651 U1 | 2/2014 |

(Continued)

OTHER PUBLICATIONS

German Search Report for corresponding application 10 2022 116 676.7 issued Feb. 14, 2023.

(Continued)

*Primary Examiner* — Rafferty D Kelly
(74) *Attorney, Agent, or Firm* — Nath, Goldberg & Meyer; Jerald L. Meyer; Stanley N. Protigal

(57) ABSTRACT

The invention relates to a code reading apparatus for detecting an at least one-dimensional optoelectronic code, said code reading apparatus comprising an illumination device that is configured to transmit a transmission light beam for generating a transmission light spot on the optoelectronic code to be detected; a scanning apparatus that comprises an oscillating mirror that is pivotable in an oscillating manner at least about a first pivot axis and that is configured to sequentially scan the optoelectronic code with the transmission light spot in at least a first scanning direction by deflecting the transmission light beam; an optoelectronic sensor that is configured to detect transmission light remitted by the optoelectronic code and to convert it into electrical reception signals; and a control device that cooperates with the optoelectronic sensor and the scanning apparatus to control the scanning apparatus and to generate an electronic code from the reception signals that comprises information encoded in the optoelectronic code.

13 Claims, 5 Drawing Sheets

(56) References Cited

U.S. PATENT DOCUMENTS

2008/0110993 A1   5/2008  Tsikos et al.
2012/0170095 A1*  7/2012  Dolleris .............. G02B 7/1821
                                                    359/212.2

FOREIGN PATENT DOCUMENTS

DE    102017121068 A1   4/2018
EP         0179275 A1   9/1985
EP         0671697 A1   9/1995
EP         0624852 B1   9/1999
GB         2469344 A   10/2010

OTHER PUBLICATIONS

Barcode reader, Wikipedia, http://de.wikipedia.org/w/index.php?title=Barcodelesger%C3%A4 . . . , accessed on Feb. 8, 2023.
Barcode, Wikipedia, https://de.wikipedia.org/w/index.php?title=Streichcode&oldid=216333656, accessed on Feb. 8, 2023.
Office Action issued on Apr. 9, 2024, for application No. EP 23 177 259.1.
Search Report issued on Apr. 23, 2024, for application No. EP 24 152 614.4.

* cited by examiner

CODE READING APPARATUS

FIELD

The present invention relates to a code reading apparatus for detecting an at least one-dimensional optoelectronic code.

BACKGROUND

One-dimensional or two-dimensional optoelectronic codes are used in different fields of application to provide articles or objects with a machine-readable and electronically processable marking. A frequently used one-dimensional optoelectronic code is the barcode. This code comprises a sequence of light and dark stripes arranged transversely to a scanning direction, wherein the information included in the barcode is encoded by the width or the distance of these stripes in the scanning direction.

The detection of such barcodes, for example, takes place using a sensing or scanning code reader in which a laser beam is guided transversely to the bars or stripes of the barcode and the light/dark signals produced by remission in this respect are acquired by a light sensor. Here, the individual characters encoded in the barcode are recorded sequentially. Furthermore, camera-based code readers are also known in which an image sensor records an image of the entire bar code and the code information is extracted from this image with the aid of image processing means.

Code readers are, for example, used at supermarket checkouts or in the logistics sector for detecting and identifying mail or parcel shipments or also for baggage handling at airports.

Camera-based code readers are in particular also used for detecting two-dimensional codes that are also known as matrix codes or QR codes. However, a two-dimensional optoelectronic code is also understood as a code that comprises a plurality of barcodes arranged line-wise below one another, i.e. a plurality of barcode sections are arranged spaced apart from one another transversely to their scanning direction, for example, on a common label. In principle, such a two-dimensional code could also be detected by a scanning code reader.

In a conventional scanning code reader, as schematically shown in FIG. 1a, the periodic scanning of the optoelectronic code often takes place with the aid of a polygon mirror wheel, also called a facet wheel, whereby a light spot or a light point is periodically guided over the light-dark regions of a bar code. The light remitted by the code is focused by means of concave mirrors and/or converging lenses onto a photodetector that converts the reflected light into an electrical signal. The optical path of such a code reader can in particular be designed such that the remitted light is also deflected by the polygon mirror wheel on its path between the code and the photodetector.

One problem with conventional code readers that have a polygon mirror wheel is that the individual facets or mirrors of such a polygon mirror wheel are often not precisely aligned. This has the result that the scan tracks generated by individual mirrors do not lie exactly on one line, but rather have a certain lateral offset transverse to the scanning direction. The precision of the scanning process is hereby reduced.

It is the object of the invention to provide a code reading apparatus for detecting an at least one-dimensional optoelectronic code that has an increased precision.

SUMMARY

The object is satisfied by a code reading apparatus for detecting an at least one-dimensional optoelectronic code comprises an illumination device that is configured to transmit a transmission light beam for generating a transmission light spot on the optoelectronic code to be detected; a scanning apparatus that comprises an oscillating mirror that is pivotable in an oscillating manner at least about a first pivot axis and that is configured to sequentially scan the optoelectronic code with the transmission light spot in at least a first scanning direction by deflecting the transmission light beam; an optoelectronic sensor that is configured to detect transmission light remitted by the optoelectronic code and to convert it into electrical reception signals; and a control device that cooperates with the optoelectronic sensor and the scanning apparatus to control the scanning apparatus and to generate an electronic code from the reception signals that comprises information encoded in the optoelectronic code.

The code reading apparatus in accordance with the invention is therefore a sensing or scanning code reader that detects the individual characters or symbols of the code sequentially, i.e. one after another in time. The oscillating mirror that is pivotable in an oscillating manner is a mirror that periodically oscillates or pivots to and fro within a limited angular range. Said control device can in particular be a combined control and evaluation device that controls the scanning apparatus in a synchronized manner and receives the reception signals from the optoelectronic sensor. The light spot preferably has a point-shaped or also a line-shaped cross-section, wherein a point-shaped cross-section is understood as a substantially circular light spot with a very small cross-section that is smaller than a character of the optoelectronic code to be detected. The optical path of the code reading apparatus in accordance with the invention is preferably configured such that the code is scanned along a straight scan line or scan track.

In contrast to a polygon mirror wheel or facet wheel that rotates continuously, preferably at a constant rotational speed, in a specific direction of rotation and that has a plurality of mirror surfaces, an oscillating mirror only comprises one mirror surface, wherein the direction of rotation of the oscillating mirror changes periodically, usually multiple times a second. The angular range in which the periodic to-and-fro movement takes place is usually limited and matched to the distance between the code and the code reading apparatus and the geometric length of the code in the scanning direction.

One advantage of the code reading apparatus in accordance with the invention is that the scanning transmission light spot always moves on the same scan track in consecutive scanning periods. Lateral deviations from the scan track are considerably reduced compared to a code reader comprising a polygon mirror wheel. On the other hand, one advantage with respect to a camera-based code reading apparatus is that, due to the sequential sequence, only a relatively small amount of computing power is required for the processing of the acquired signals, whereby a cost advantage results.

In accordance with a preferred embodiment, the oscillating mirror is additionally pivotable in an oscillating manner about a second pivot axis to sequentially scan the optoelectronic code with the transmission light spot additionally in a second scanning direction by deflecting the transmission light beam. Thus, the relative position of the scan line transverse to the scanning direction can be changed or a two-dimensional optoelectronic code can also be scanned, which will be explained in more detail below. The second pivot axis preferably extends perpendicular to the first pivot axis. This in particular results in the advantage that the second scanning direction extends perpendicular to the first scanning direction, which is in particular advantageous for the scanning of two-dimensional (matrix) codes explained below.

In accordance with a further preferred embodiment, the optoelectronic code to be detected is two-dimensional, with the scanning apparatus being configured to scan the optoelectronic code line-wise. As mentioned above, a two-dimensional optoelectronic code, for example a matrix code or a QR code, can thereby be scanned. Such matrix codes comprise a plurality of mostly square symbols that are arranged in rows and columns and that encode a light-dark contrast or also a color contrast. The scanning of such a two-dimensional code usually takes place code line by code line, wherein after scanning a line by pivoting the oscillating mirror about the first pivot axis, the oscillating mirror is pivoted by a small amount about the second pivot axis so that during a subsequent period of the pivot movement about the first pivot axis, an adjacent line of the two-dimensional code is scanned. In general, the scan lines can, however, also extend obliquely to the code lines.

In accordance with a further preferred embodiment, the scanning apparatus comprises at least one translationally acting actuator that cooperates with the oscillating mirror via a connecting rod to pivot the oscillating mirror about a respective pivot axis. The translationally acting actuator is thus a linear drive, for example a linear stepper motor, a piezo drive or also a solenoid drive, which will be explained in more detail below. The connecting rod is connected, spaced apart from the pivot axis, in an articulated manner to the oscillating mirror and transforms the linear movement of the actuator into a rotational movement of the oscillating mirror. The angular range within which the oscillating mirror can be pivoted mainly results from the adjustment path of the actuator and the distance of the pivot point of the connecting rod at the oscillating mirror. An oscillating drive for the oscillating mirror that enables the oscillating pivoting of the oscillating mirror with the required frequency can hereby be produced in a cost-effective manner.

In this connection, it has proven to be advantageous if the connecting rod is connected in an articulated manner to the oscillating mirror at a coupling point, wherein the coupling point is spaced apart from the associated pivot axis. If the oscillating mirror is pivotable about a plurality of pivot axes, the associated pivot axis is that pivot axis about which the oscillating mirror is pivoted by the above-mentioned actuator and the connecting rod connected thereto. Alternatively, an articulated connection of the connecting rod can also take place at a crank arm that, just like the oscillating mirror, is rotationally fixedly connected to a shaft defining the pivot axis.

In accordance with a further preferred embodiment, the translationally acting actuator is configured as a solenoid drive that comprises a coil, preferably a cylindrical coil, and a permanent magnet that can be linearly displaced by means of a magnetic field generated by the coil. In this respect, the coil and the permanent magnet are arranged such that the magnetic field generated by the cylindrical coil either attracts or repels the permanent magnet depending on the polarity of the current flowing through it, whereby the to-and-fro movement of the oscillating mirror can be generated. Solenoid drives represent translationally acting actuators that are inexpensive to manufacture and that can, at the same time, be operated with the frequency required for scanning.

In this connection, it can be advantageous if the solenoid drive comprises a damping device, preferably a friction element or a spring element, that is configured to damp a movement of the permanent magnet if, for example, friction forces that are present anyway do not have a sufficient damping effect or if the position and speed of the permanent magnet cannot be sufficiently defined by the magnetic field strength. The damping device can be integrated into the solenoid drive or can also act on the oscillating mirror or the pivot axis and serves to control the course of the to-and-fro movement of the oscillating mirror, in particular its rotational speed and/or rotational acceleration. Here, a friction element can slow down the movement of the permanent magnet. When a spring element is used, a force-displacement relationship can be established between the adjustment position of the oscillating mirror and the field strength of the cylindrical coil, wherein the field strength in turn depends on the current strength of the operating current flowing around the cylindrical coil. Taking into account further factors, in particular geometric parameters, a desired angular position can thus be approached by setting a specific current intensity. For this purpose, the current strength can, for example, be set in accordance with a predefined ramp function.

For a scanning of a two-dimensional optoelectronic code, in accordance with one embodiment, a second oscillating mirror can be provided that is pivotable in an oscillating manner about an associated further pivot axis and that can be arranged both in front of the first oscillating mirror and behind the first oscillating mirror, viewed in the direction of propagation of the transmission light beam. The pivot axes of the two oscillating mirrors preferably extend perpendicular to one another. With the aid of the second oscillating mirror, the optoelectronic code to be detected can also be scanned in a second scanning direction that preferably extends perpendicular to the first scanning direction.

Alternatively, in accordance with a particularly preferred embodiment of the invention, the oscillating mirror, i.e. the one oscillating mirror mentioned at the beginning, is, however, additionally pivotable in an oscillating manner about a second pivot axis, wherein the scanning apparatus comprises a first translationally acting actuator that cooperates with the oscillating mirror via a first connecting rod that is connected in an articulated manner to the oscillating mirror at a first coupling point spaced apart from the first pivot axis in order to pivot the oscillating mirror about the first pivot axis, wherein, at a support point, the first pivot axis is tiltably supported about the second pivot axis and is rotatably supported about the first pivot axis, and wherein the scanning apparatus comprises a second translationally acting actuator that cooperates with the first pivot axis via a second connecting rod that is connected in an articulated manner to the first pivot axis at a second coupling point spaced apart from the support point in order to pivot the oscillating mirror about the second pivot axis. The second coupling point is thus moved along a circular path in space via the connecting rod, whereby the position of the first pivot axis in space can be changed by tilting or pivoting about the second pivot axis. The second pivot axis extends through the support point of the first pivot axis that is thus disposed at the point of intersection of the two pivot axes. In this way, a scanning of two-dimensional optoelectronic codes can be realized in a simple manner using two linear drives and a single oscillating mirror. Advantageously, both pivot axes extend perpendicular to one another, whereby both scanning directions are also aligned orthogonally to one another. A further advantage of this embodiment is that, even in applications in which usually only a one-dimensional bar code is detected in this respect, an extension to two-dimensional codes is temporarily also possible, which would otherwise only be realizable by considerably more expensive camera-based solutions.

In accordance with a further preferred embodiment, the scanning apparatus comprises at least one rotationally acting actuator that directly or indirectly cooperates with the oscillating mirror to pivot the oscillating mirror about a respective pivot axis. The rotationally acting actuator can, for example, be a motor, a (rotary) coil drive, or a stepper motor. In general, in accordance with a variation of the preferred embodiment described above with two translationally acting actuators, one or both of these translationally acting actuators can also be replaced by a rotationally acting actuator. With a direct coupling, a respective axis of rotation of the actuator is, for example, directly coupled to the associated pivot axis of the oscillating mirror. With an indirect coupling, a gear or even a gimbal (in the case of two rotationally acting actuators) can, for example, be provided between the actuator and the oscillating mirror.

In accordance with a further preferred embodiment, the optoelectronic code to be detected comprises binary symbols that are defined by light and dark code regions. The symbols can, for example, be stripes of different widths or square areas. In such an embodiment, the code reading apparatus is designed for scanning and possibly evaluating such a code.

In accordance with a further advantageous embodiment, the control device cooperates with the scanning apparatus to directly or indirectly detect an angular position of the oscillating mirror and/or to pivot the oscillating mirror into a predefined angular position. The accuracy of the scanning of the code can hereby in particular be improved since a respective angular position of the scanning apparatus, which defines the location on the optoelectronic code at which a scanning signal is determined at a specific point in time, can be detected or intentionally approached. For the direct detection of the angular position, a corresponding angular position encoder can, for example, be provided that cooperates with the control device. An indirect detection can, for example, take place by a position measurement unit or a position encoder that is configured to determine an adjustment position of an actuator provided for pivoting the oscillating mirror. The position encoder can, for example, be configured to determine a longitudinal position of a magnet or a piston of a translationally acting actuator, wherein the angular position can be determined from the determined longitudinal position taking into account geometric parameters such as lengths, distances and angular relationships of a gear interposed for converting the translational movement into the pivot movement, e.g. the aforementioned connecting rod. For example, an actuator designed as a stepper motor or another translationally or rotationally acting actuator described above, which can possibly be coupled to the oscillating mirror via a damping element, can be provided for a pivoting of the oscillating mirror into a predefined angular position. The detected angular or longitudinal position can preferably be incorporated into a control of the oscillating mirror using a regulation algorithm or a regulation circuit, e.g. a PID control.

BRIEF DESCRIPTION OF THE DRAWINGS

The invention will be described in the following with reference to embodiments and to the drawings.

There are shown.

DETAILED DESCRIPTION

Figure 1A:
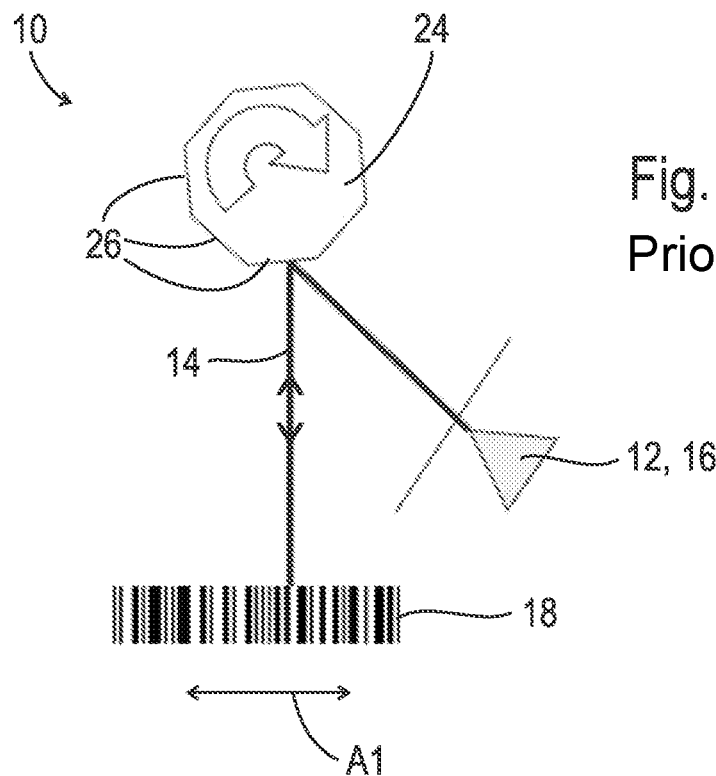
FIG. 1a a schematic representation of a code reading apparatus in accordance with the prior art.

In the following, the same or similar elements or components are designated by the same reference numerals.

Figure 2:
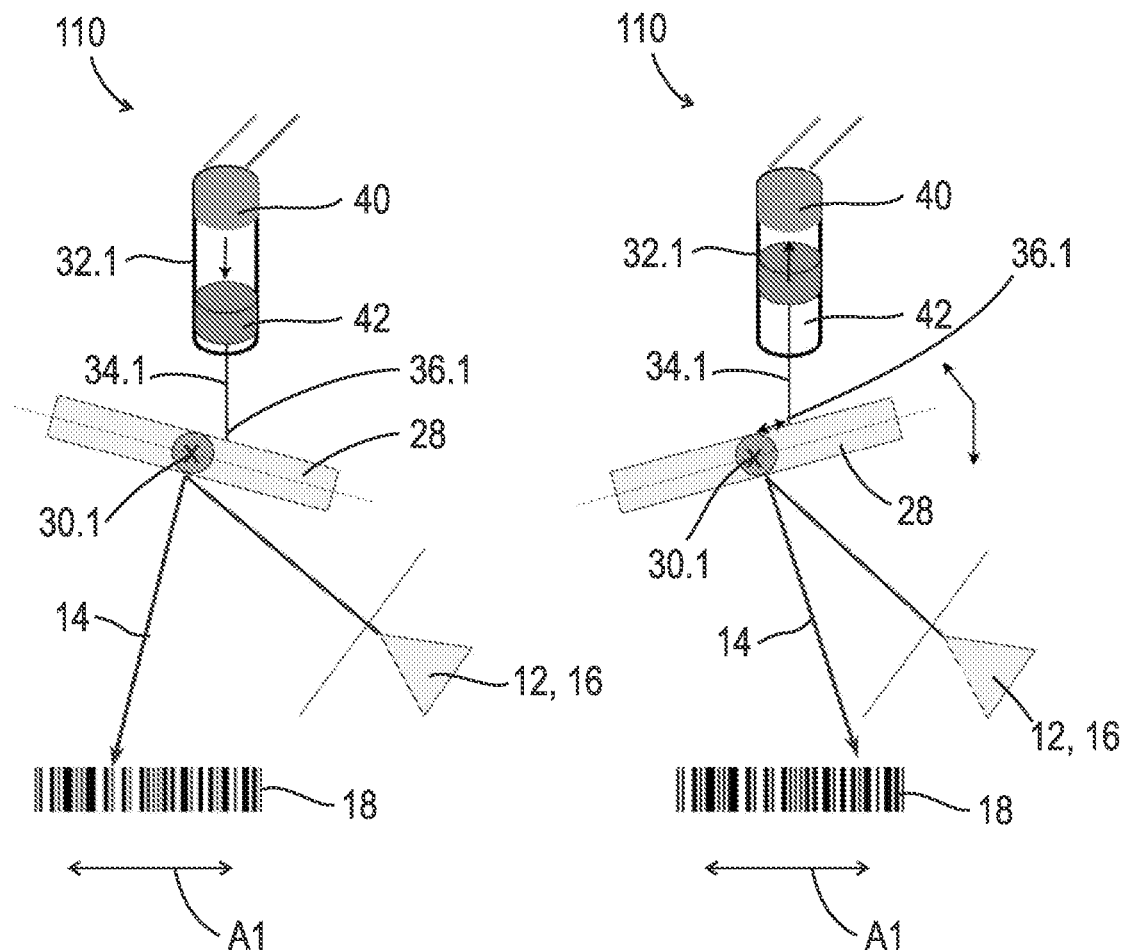
FIG. 2 a schematic representation of a code reading apparatus in accordance with a first embodiment in different operating positions.
Figure 3A:
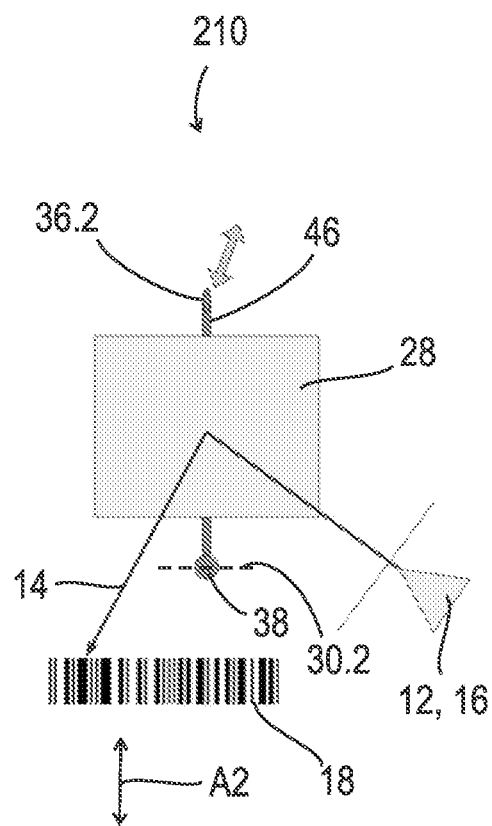
FIG. 3a a schematic representation of a code reading apparatus in accordance with a second embodiment in a side view.
Figure 3B:
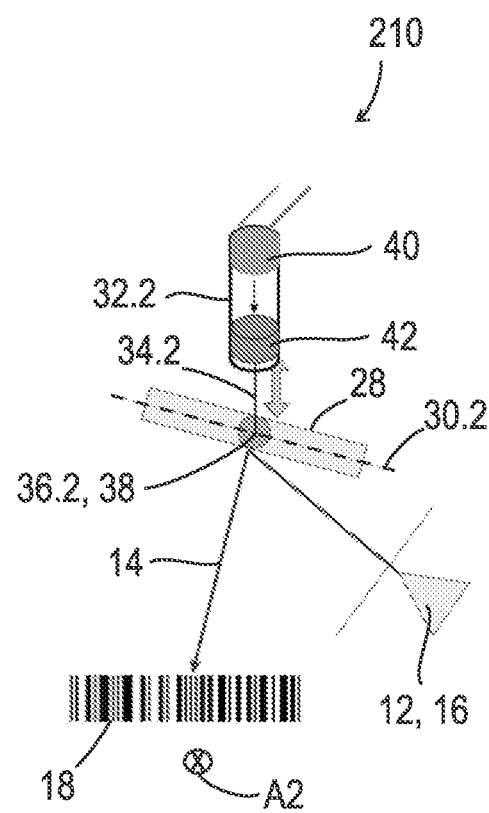
FIG. 3b the code reading apparatus in accordance with FIG. 3a in a plan view.
Figure 4:
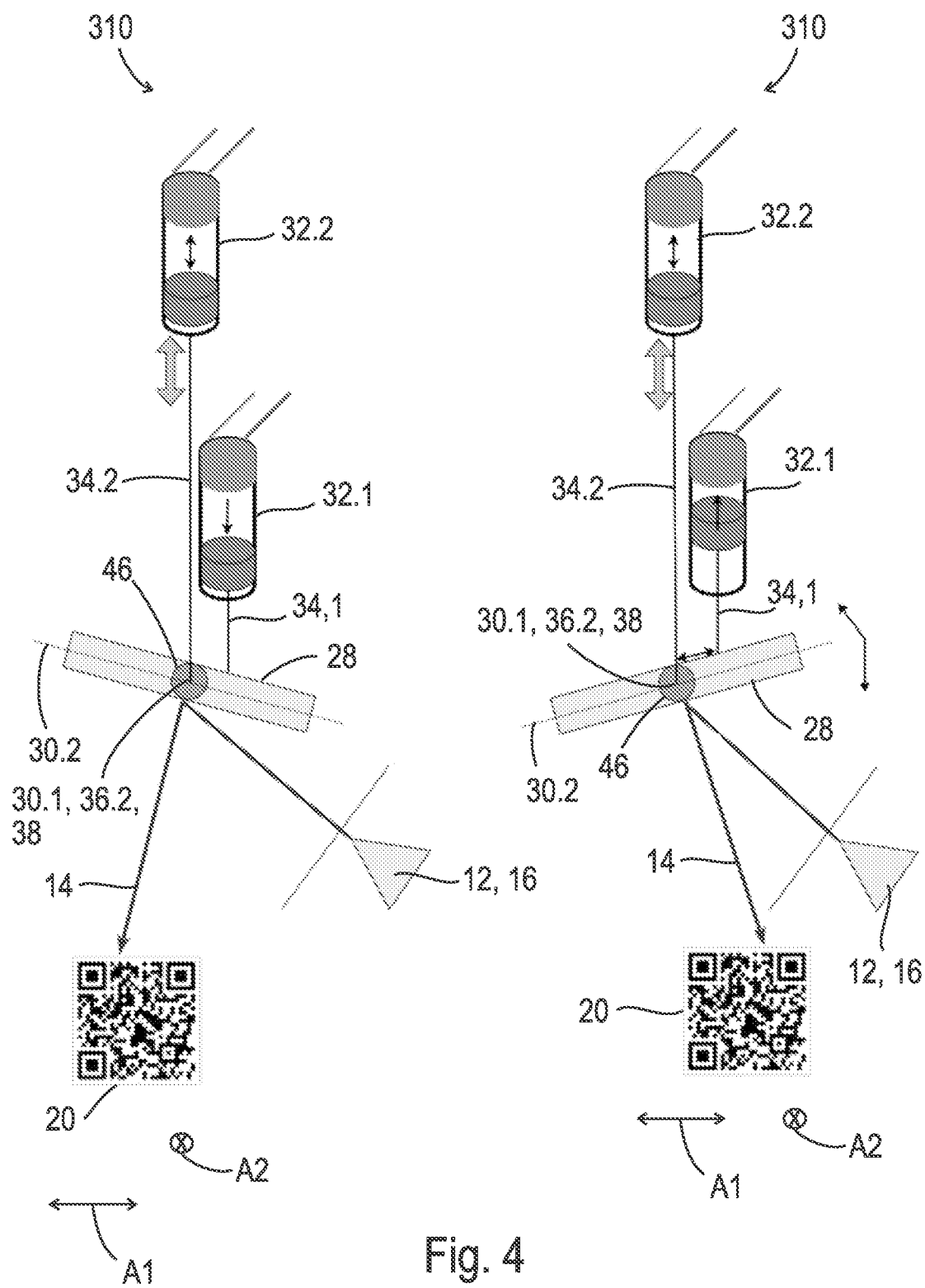
FIG. 4 a schematic representation of a code reading apparatus in accordance with a third embodiment in different operating positions.

In FIGS. 1a and 2 to 4, different code reading apparatus are shown for which the common features are first explained. FIG. 1a shows a code reading apparatus 10 in accordance with the prior art, while FIGS. 2 to 4 show code reading apparatus 110, 210, 310 in accordance with different embodiments of the invention. The code reading apparatus 10, 110, 210, 310 each comprise an illumination device 12 that is configured to transmit a transmission light beam 14 for generating a transmission light spot on a one-dimensional optical code 18 or a two-dimensional optoelectronic code 20 to be detected. The transmission light remitted by the optoelectronic code 18, 20 is transmitted back on the same path in the direction of an optoelectronic sensor 16 so that the reference numeral 14 simultaneously also indicates a reception light beam. The illumination device 12 and the optoelectronic sensor 16 are shown here purely schematically as a common unit and, in addition to a light source, for example a laser, can also comprise different beam-shaping elements such as lenses, concave mirrors, diffractive optical elements and beam-splitting elements, with this list being purely exemplary and not exhaustive. The arrangement of the illumination device 12 and the optoelectronic sensor 16 in a common unit is purely exemplary so that both can also be configured as separate units.

The code reading apparatus 10, 110, 210, 310 comprise a respective scanning apparatus that is configured to sequentially scan the optoelectronic code 18, 20 with the transmission light spot in at least a first scanning direction by deflecting the transmission light beam 14. In accordance with the light and dark code regions, reception light of varying intensity is detected by the optoelectronic sensor 16 and converted into electrical reception signals. The electrical reception signals are transmitted to a control device (not shown) connected to the optoelectronic sensor 16 and preferably also to the illumination device 12 and/or the scanning apparatus. The control device generates an electronic code from the reception signals that comprises information encoded in the optoelectronic code 18, 20. The sequentially generated reception signals can, for example, be in the form of serial RLC data (Run Length Code) or can also be converted into a standardized image format such as BMP or JPEG. The data can be captured in the form of gray values or can also be converted to black and white values.

In the code reading apparatus 10 in accordance with the prior art (FIG. 1a), the scanning apparatus comprises a polygon mirror wheel 24 or a facet wheel that has a total of eight mirror surfaces 26 at its periphery. The polygon mirror wheel 24 rotates at a constant speed about an axis of rotation so that the transmission light beam 14 is reflected from a specific mirror surface 26 in each case. Due to the rotational movement, the angular orientation of the respective mirror surface 26 changes relative to the reception light beam, whereby the optoelectronic code 18 is scanned in its main direction of extent by the transmission light beam 14.

Figure 1B:
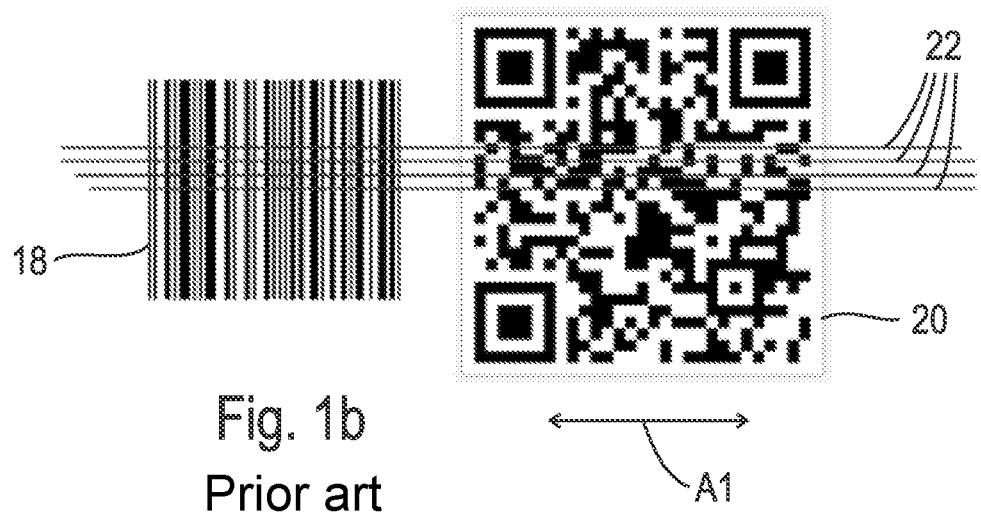
FIG. 1b a schematic representation of a scan of a one-dimensional and a two-dimensional optoelectronic code in accordance with the prior art.

One problem with the code reading apparatus 10 is that the mirror surfaces 26 can be tilted in slightly different ways with respect to the axis of rotation of the polygon mirror wheel 24. As can be seen in FIG. 1b, this results in the reception light beam 14 or the transmission light spot 14 generated therefrom being guided along different scan lines 22, which are spaced apart in parallel from one another, in dependence on the respective mirror surface 26 from which the transmission light beam 14 was reflected. If, with such a code reading apparatus 10, only a one-dimensional code 18, for example a barcode with a certain extent transverse to the scanning direction, is to be scanned, this property, which is also referred to as jitter, is relatively unproblematic. However, if a two-dimensional code 20, for example a QR code or another matrix code, is to be scanned, this results in different code lines being scanned within the code matrix in dependence on the reflective mirror surface. An error-free detection of a two-dimensional code 20 is thereby not possible.

This problem is avoided in the code reading apparatus 110, 210, 310 in accordance with the embodiments (FIGS. 2 to 4). The scanning apparatus of these code reading apparatus 110, 210, 310 in accordance with the invention comprise a respective oscillating mirror 28 that is pivotable about a first pivot axis 30.1 and/or about a second pivot axis 30.2. Since the transmission light beam 14 is always deflected by the same mirror surface of the oscillating mirror 28, the jitter or the parallel displacement of the scan lines is considerably reduced and is, in principle, substantially only defined by a possible slight bearing play of the pivot axes 30.1, 30.2.

In the embodiment in accordance with FIG. 2, the driving of the oscillating mirror 28 takes place via a linearly acting actuator 32.1 that is configured as a solenoid drive comprising a cylindrical coil 40 and a permanent magnet 42 in the embodiment. The permanent magnet 42 is selectively attracted or repelled by a current flow through the cylindrical coil 40 in dependence on the polarity. The linear movement of the permanent magnet 42 is transmitted to the oscillating mirror 28 via a connecting rod 34.1, which is connected in an articulated manner to the oscillating mirror 28 at a coupling point 36.1 spaced apart from the pivot axis 30.1, and sets the oscillating mirror 28 into an oscillating pivot movement. In this embodiment, the pivot axis 30.1 extends perpendicular to the drawing plane and guides the transmission light beam 14 over the optoelectronic code 18 in the scanning direction A.1 represented by a double arrow. Two different operating positions are shown in FIG. 2.

In the code reading apparatus 210 in accordance with the embodiment of FIGS. 3a and 3b, a pivoting of the oscillating mirror 28 about a second pivot axis 30.2 is provided, said second pivot axis 30.2 extending perpendicular to the first pivot axis 30.1 in comparison with the code reading apparatus 110 (FIG. 2). The oscillating mirror 28 is fastened to a bar 46 that is tiltably supported with its one free end at a support point 38 (cf. FIG. 3a). The oppositely disposed free end of the bar 46 forms a coupling point 36.2 for a second connecting rod 34.2. The coupling point 36.2 and the support point 38 lie above one another in the plan view of FIG. 3b. As can be easily seen in FIG. 3b, the connecting rod 34.2 connects a second linearly acting actuator 32.2 to the bar 46 or the oscillating mirror 28. The second actuator 32.2 is similar in its design and operation to the first actuator 32.1 (FIG. 2). Due to the linear movement of the permanent magnet 42, the oscillating mirror 28 is pivoted about the second pivot axis 30.2 that extends through the support point 38 (see FIG. 3a).

Due to the oscillating pivot movement about the second pivot axis 30.2, the transmission light beam 14 is deflected in a second scanning direction A.2 that extends perpendicular to the first scanning direction A.1 (FIG. 2).

The code reading apparatus 310 in accordance with the embodiment of FIG. 4 represents a combination of the code reading apparatus 110 (FIG. 2) and 210 (FIGS. 3a and 3b) with respect to the scanning apparatus. Accordingly, the oscillating mirror 28 is pivotable both about the first pivot axis 30.1 and about the second pivot axis 30.2 extending perpendicular thereto. A two-dimensional code can thereby in particular also be scanned in both directions, wherein in FIG. 4 the first scanning direction A.1 extends in the horizontal direction in the drawing plane and the second scanning direction A.2 extends perpendicular to the drawing plane. Here, the bar 46 not only serves as a support for the oscillating mirror 28, but also defines the first pivot axis 30.1. For this purpose, the support point 32.2 and the coupling point 38 are configured such that, beside the tilting about the second pivot axis 30.2, a rotation about the first pivot axis 30.1 is additionally also permitted. The support point 38 can, for example, be realized by a ball joint arranged at a housing of the code reading apparatus 310.

In addition to a scanning of a two-dimensional optoelectronic code 20, the relative position of the scan line 22 transverse to the first scanning direction A.1 can be shifted by the code reading apparatus 310 in accordance with FIG. 4. It is thereby, for example, possible to reliably detect optoelectronic codes that are attached to respective objects to be detected in different positions with respect to a relative position transverse to the scanning direction.

With the code reading apparatus 110, 210, 310, the pivot angular range of the oscillating mirror 28 can, for example, amount to between 30° and 60° in each case. The oscillation frequency of the oscillating mirror 28 about the first or the second pivot axis 30.1 or 30.2 can be in the order of magnitude of 1000 Hz in the case of the code reading apparatus 110, 210, 310, wherein, in the case of the two-axis code reading apparatus 310 (FIG. 4), the oscillation frequency about the second pivot axis 30.2 can be smaller by a factor of 100 to 1000 than the oscillation frequency about the first pivot axis 30.1. With all the code reading apparatus 110, 210, 310, a single one-dimensional code 18 or a respective line of a two-dimensional code can be scanned once or can also be scanned multiple times in succession to improve the error rate.

Figures 5A, 5B:
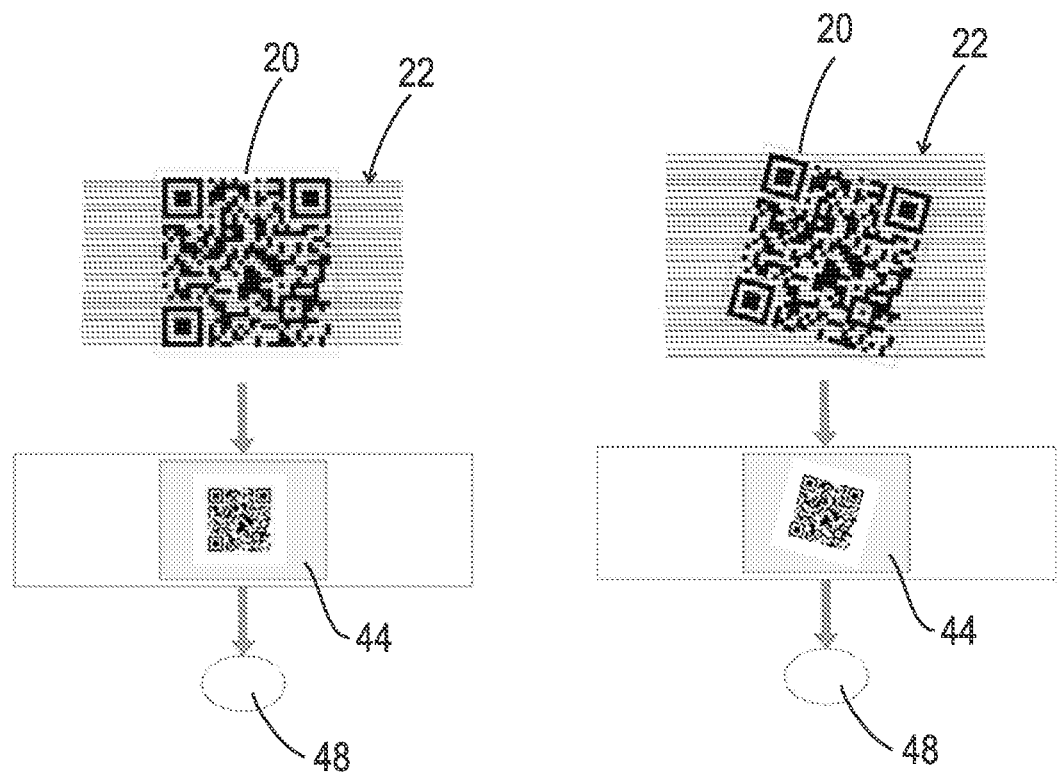
FIGS. 5a and 5b schematic representations of scans of a two-dimensional optoelectronic code.

Referring now to FIGS. 5a and 5b, two different applications for detecting a two-dimensional code 20 with the code reading apparatus 310 (FIG. 4) are explained. As mentioned above, a two-dimensional code 20, such as the QR code shown in FIGS. 5a and 5b, can have a plurality of binary symbols arranged in rows and columns.

If the lines of the two-dimensional code 20 in accordance with FIG. 5a are aligned in parallel with the first scanning direction A.1, a respective line of the two-dimensional code 20 can be scanned and detected with each scanning period, wherein the oscillating mirror 28 is pivoted about the first pivot axis 30.1 for a respective scanning period. To detect a further line of the code 20, the oscillating mirror 28 is pivoted by a small amount about the second pivot axis 30.2 in accordance with the line spacing of the code 20 and the distance of the code 20 from the code reading apparatus of the oscillating mirror. Due to a line-wise scanning of the code 20, an image 44 of the code 20 can be generated that can subsequently be further processed in a control device 48. If necessary, when evaluating the image 44, the image region to be processed can be reduced by defining a selection region (ROI, Region Of Interest) or by cropping the image to such a selection region.

In the case shown in FIG. 5*b*, the code 20 is oriented obliquely to the scan lines 22 extending in the first scanning direction A.1. In this case, the code 20 can also be scanned in the manner described with reference to FIG. 5*a*.

Corresponding to the twisting of the code 20, the image 44 generated in this way obtains a twisted image of the code 20. This twisting can be corrected by image processing means in the control device 48 so that an evaluation of an aligned image of the code 20 can subsequently take place. To enable a complete detection of the code 20 for a code 20 oriented obliquely to the scanning direction A.1 or A.2, the scanning frequency has to be increased in both the first scanning direction A.1 and the second scanning direction A.2 compared to the situation shown in FIG. 5*a*. In accordance with the Nyquist-Shannon sampling theorem, the scanning frequency has to correspond to at least twice the spatial frequency of the two-dimensional code 20 in both the horizontal and the vertical direction. In this regard, the density of the representation of the scan lines 22 in FIG. 5*b* is only schematic and is less than theoretically required.

The code reading apparatus 110, 210, 310 in accordance with the embodiments of FIGS. 2 to 4 enable, at least in certain applications, a simple acquisition of the information included in the optoelectronic code 18, 20 by a run length code (RLC), which reduces the costs for the necessary data processing means compared to an image processing-based evaluation.

Compared to the code reading apparatus 10 in accordance with the prior art (FIG. 1*a*) comprising a scanning apparatus having a polygon mirror wheel 24, a reduction in the manufacturing costs as well as an increase in the service life can likewise be achieved by the oscillating mirror-based solution in accordance with the invention. Further advantages of the code reading apparatus 110, 210, 310 compared to a conventional code reading apparatus 10 comprise a reduction in the required installation space, a simplification of the production, and a reduction of the complexity by reducing the number of moving parts. Yet a further advantage is that, compared to a polygon mirror wheel 24, an adaptation of the scanning range also becomes possible through the presented drive concept for the oscillating mirror 28 in that the deflection or the pivot range of the oscillating mirror 28 can be set or parameterized.

REFERENCE NUMERAL LIST

10, 110, 210, 310 code reading apparatus
12 illumination device
14 transmission light beam, reception light beam
16 sensor
18 one-dimensional optoelectronic code
20 two-dimensional optoelectronic code
22 scan line
24 polygon mirror wheel
26 mirror surface
28 oscillating mirror
30.1, 30.2 pivot axis
32.1, 32.2 actuator
34.1, 34.2 connecting rod
36.1, 36.2 coupling point
38 support point
40 cylindrical coil
42 permanent magnet
44 image
46 bar
48 control device
A.1, A.2 scanning direction

The invention claimed is:

1. A code reading apparatus for detecting an at least one-dimensional optoelectronic code, said code reading apparatus comprising
    an illumination device that is configured to transmit a transmission light beam for generating a transmission light spot on the optoelectronic code to be detected;
    a scanning apparatus that comprises an oscillating mirror that is pivotable in an oscillating manner at least about a first pivot axis and that is configured to sequentially scan the optoelectronic code with the transmission light spot in at least a first scanning direction by deflecting the transmission light beam,
        wherein the oscillating mirror is additionally pivotable in an oscillating manner about a second pivot axis, with the scanning apparatus comprising a first translationally acting actuator that cooperates with the oscillating mirror via a first connecting rod that is connected in an articulated manner to the oscillating mirror at a first coupling point spaced apart from the first pivot axis in order to pivot the oscillating mirror about the first pivot axis,
        wherein, at a support point, the first pivot axis is tiltably supported about the second pivot axis and is rotatably supported about the first pivot axis,
        and wherein the scanning apparatus comprises a second translationally acting actuator that cooperates with the first pivot axis via a second connecting rod that is connected in an articulated manner to the first pivot axis at a second coupling point spaced apart from the support point in order to pivot the oscillating mirror about the second pivot axis;
    an optoelectronic sensor that is configured to detect transmission light remitted by the optoelectronic code and to convert it into electrical reception signals; and
    a control device that cooperates with the optoelectronic sensor and the scanning apparatus to control the scanning apparatus and to generate an electronic code from the reception signals that comprises information encoded in the optoelectronic code.

2. The code reading apparatus in accordance with claim 1, wherein the oscillating mirror is additionally pivotable in an oscillating manner about a second pivot axis to sequentially scan the optoelectronic code with the transmission light spot additionally in a second scanning direction by deflecting the transmission light beam.

3. The code reading apparatus in accordance with claim 2, wherein the second pivot axis extends perpendicular to the first pivot axis.

4. The code reading apparatus in accordance with claim 2, wherein the optoelectronic code to be detected is two-dimensional, with the scanning apparatus being configured to scan the optoelectronic code line-wise.

5. The code reading apparatus in accordance with claim 1, wherein the scanning apparatus comprises at least one translationally acting actuator that cooperates with the oscillating mirror via a connecting rod to pivot the oscillating mirror about a respective pivot axis.

6. The code reading apparatus in accordance with claim 5, wherein the connecting rod is connected in an articulated manner to the oscillating mirror at a coupling point, with the coupling point being spaced apart from the associated pivot axis.

7. The code reading apparatus in accordance with claim 5, wherein the translationally acting actuator is configured as a solenoid drive that comprises a coil and a permanent magnet that can be linearly displaced by means of a magnetic field generated by the coil.

8. The code reading apparatus in accordance with claim 7, wherein the coil is a cylindrical coil.

9. The code reading apparatus in accordance with claim 7, wherein the solenoid drive comprises a damping device that is configured to damp a movement of the permanent magnet.

10. The code reading apparatus in accordance with claim 9, wherein the damping device is one of a friction element and a spring element.

11. The code reading apparatus in accordance with claim 1, wherein the scanning apparatus comprises at least one rotationally acting actuator that cooperates with the oscillating mirror to pivot the oscillating mirror directly or indirectly about a respective pivot axis.

12. The code reading apparatus in accordance with claim 1, wherein the optoelectronic code to be detected comprises binary symbols that are defined by light and dark code regions.

13. The code reading apparatus in accordance with claim 1, wherein the control device cooperates with the scanning apparatus to directly or indirectly detect an angular position of the oscillating mirror and/or to pivot the oscillating mirror into a predefined angular position.

* * * * *